May 19, 1970    W. J. CAGLE    3,512,588
ROW MARKER ASSEMBLY

Filed Jan. 31, 1968    6 Sheets-Sheet 1

INVENTOR.
WESLEY J. CAGLE

May 19, 1970  W. J. CAGLE  3,512,588
ROW MARKER ASSEMBLY

Filed Jan. 31, 1968  6 Sheets-Sheet 2

INVENTOR.
WESLEY J. CAGLE

May 19, 1970 W. J. CAGLE 3,512,588
ROW MARKER ASSEMBLY
Filed Jan. 31, 1968 6 Sheets-Sheet 4

INVENTOR.
WESLEY J. CAGLE

May 19, 1970 W. J. CAGLE 3,512,588
ROW MARKER ASSEMBLY

Filed Jan. 31, 1968 6 Sheets-Sheet 5

INVENTOR.
WESLEY J. CAGLE

United States Patent Office 3,512,588
Patented May 19, 1970

3,512,588
ROW MARKER ASSEMBLY
Wesley J. Cagle, Huntsville, Ala., assignor to J. I. Case Company, Racine, Wis., a corporation of Wisconsin
Filed Jan. 31, 1968, Ser. No. 705,881
Int. Cl. A01b 35/32
U.S. Cl. 172—130          12 Claims

ABSTRACT OF THE DISCLOSURE

A marker mechanism for an implement capable of being raised and lowered by hydraulic means, the mechanism including marker arms pivotally connected to the implement, reel means connected to the frame and to the hydraulic means, and cable means connected to the marker arms and to the reel means for raising the arms as the implement is raised. The mechanism also includes latch means on the marker arms for holding the arms in a raised position, and trip means for lowering the arms as the implement is lowered. The marker assembly includes an alternating arrangement to lower one or the other of the arms in one aspect of the invention whereby provision is made for automatic marker operation.

BACKGROUND OF THE INVENTION

Row markers have been used in the past in connection with agricultural implements where it is desired to maintain an exact line of crop rows across a field. This is particularly important in the area of seeking equipment so as to have evenly spaced rows when using wide framed implements. Some of these implements may be 40 to 50 feet wide and the tractor operator is therefore at a distance from the last planted row and he cannot readily ascertain the position of the end or side units in relation to this last row when making the next pass across the field. Of course, the early row markers and actuating mechanisms may appear quite crude when compared to the mechanisms being designed and produced today, so that improvements in row marker mechanisms are therefore desirable, and the prior art shows many of the improved devices.

The prior art shows the use of markers controlled by linkages, springs and the like, the use of cables or ropes around pulleys or sheaves wherein the sheaves are laterally or vertically displaced when moving the markers, and the use of hydraulic means connected between row marker control arms for raising and lowering the marker arms. Features shown in the prior art also provide for over-center relationships and connections whereby when the planter or implement is turned at the end of a row, the marker is raised. Additionally, another feature shown in the prior art is the use of a self-interrupting clutch means acting through a quick-return motion which is effective when the implement is moved forwardly. Of course, tractor mounted implements are shown wherein the tractor mechanism raises and lowers the implement and includes delayed action means responsive to this movement for raising and lowering the markers.

SUMMARY OF THE INVENTION

The present invention relates to row markers and more particularly to the mechanism for raising and lowering the markers at the ends of the field. The row marker assembly includes marker arms pivotally connected to the frame at the sides or ends thereof, a marker mast centrally positioned on the frame, a takeup reel on the mast for raising and lowering the arms, and cable or rope means connecting the marker arms and the take-up reel. In one embodiment of the invention, the lowering of the marker arms is accomplished manually by trip means operable from the tractor and the implement has connections with the take-up reel to rotate the reel. The reel is connected to a rockshaft adjacent the mast so that when the implement is raised, one or the other of the marker arms are raised. The implement with which the present invention is associated will be described as a trail type toolbar which includes one or more transversely extending bars, a rockshaft journaled on the implement frame, and units for planting seed in rows. The trail type toolbar carrier combines the advantages of a tractor mounted toolbar with those of a pull type machine. The planting units may be adjustably positioned across the bar and other tillage units or fertilizer units may be attached to additional bars. A hydraulic cylinder is connected between the frame and the rockshaft for rotating the shaft which raises or lowers the ground wheels, which in turn, actuate mechanism for raising and lowering the marker arms.

The take-up reel or rotating bar means on the marker mast is actuated by a link or arm connected to the rockshaft and the reel turns as the shaft is rotated. A continuous cable is attached to each of the marker arms and is trained or threaded on pulleys or sheaves on the tape-up reel. The cable is sufficiently long to permit one marker to be lowered while the other marker remains in the raised position, this action taking place when the reel is rotated in a direction aligning with the rockshaft. The reel is constructed such that one end of the cable is kept in a stationary position as the reel is rotated to raise the lowered marker. Cable adjustment is made by sliding a clamp up or down on the marker arm to which the cable is attached, and a latching device is attached to each marker arm so that the arms are individually latched in the raised position. The individual marker arm latch is tripped by a rope actuated by the operator from the tractor, this being the manually tripping concept. The trip ropes extend from the trip latches to the center mast and forwardly to a location convenient to the operator.

In the raised position, the marker arms are substantially vertical to reduce the overall width of the toolbar for traveling through gates, on roads, or for operating near fences. In this position, the tripping of the latch by the operator is not sufficient to move the marker arm, so the arm will not drop by gravity alone. A resilient means in the form of a flat leaf spring is attached to an upstanding frame member such that in the latched position the spring is compressed by the marker arm, and when the latch is tripped, the spring forces the arm outwardly to initiate the lowering movement. In this way, the arm is forced to a position where gravity takes over and the arm then swings to the lowered position, as the implement is lowered. The spring also serves to cushion the marker arm on raising as when the implement is raised rapidly by rotation of the rockshaft, the arm also comes up quite rapidly and then just before the arm engages with the latching device the marker arm contacts the flat spring, thus compressing it which absorbs any shock on the marker arm. This feature prevents possible damage to the arm or implement parts if the planter is raised quite fast.

If the machine is lowered without tripping either of the latches, the take-up reel is not rotated or reversed by operation of the actuating link, but is held in place by pressure exerted by a spring washer on a pivot against a friction disk positioned between the take-up reel and the marker mast.

The actuating link for the take-up reel is constructed such that it alleviates the necessity for adjusting the marker lift cable when operating the implement at various heights. The link is constructed of two parts with a spring between the parts, such that as the implement frame is raised, the actuating link is conditioned to a predetermined length. The spring effects a shortening of the extended length of the actuating link as the marker approaches the raised position and the force on the cable decreases by reason of the effectively shortened link condition.

In a second embodiment of the invention, an automatic latching and unlatching mechanism is provided which is attached to the marker mast, this mechanism replacing the operator's manual control. This mechanism includes a double ratchet arrangement wherein the arms or pawls are actuated by the angular rotation of the rockshaft. The basic parts include a latch reel or disk having rollers on pins which are angularly displaced, a pair of pawl type trip arms connected to the rockshaft and a reel stop which is spring held and engageable with the disk rollers. This mechanism is operated in an alternating or reciprocating fashtion such that as the machine is lowered, one of the trip arms engages a roller on one side of and rotates the disk, and a roller on the opposite side of the disk pushes the other arm away from and out of engagement with the disk. The trip arms are therefore positioned adjacent the latching disk and one or the other of the marker arms is tripped by means of ropes connected between the marker arms and the trip arms. The ends of the trip arms, to which the trip ropes are connected, are moved in a fore-and-aft direction as the rockshaft is rotated when raising and lowering the implement and the marker arms are tripped by reason of this movement. As the machine is raised and lowered again, the tripping action is switched from one arm to the other for lowering the other arm.

The manually operated latch may be used on either the smaller or the larger machines, and likewise the automatic latch mechanism, so that the operator has a choice of tripping devices available with the basic marker mast and reel assembly. The advantages and features of the mechanism will become apparent and more clearly defined from a reading of the following specification taken with the annexed drawings, in which.

Figure 1:
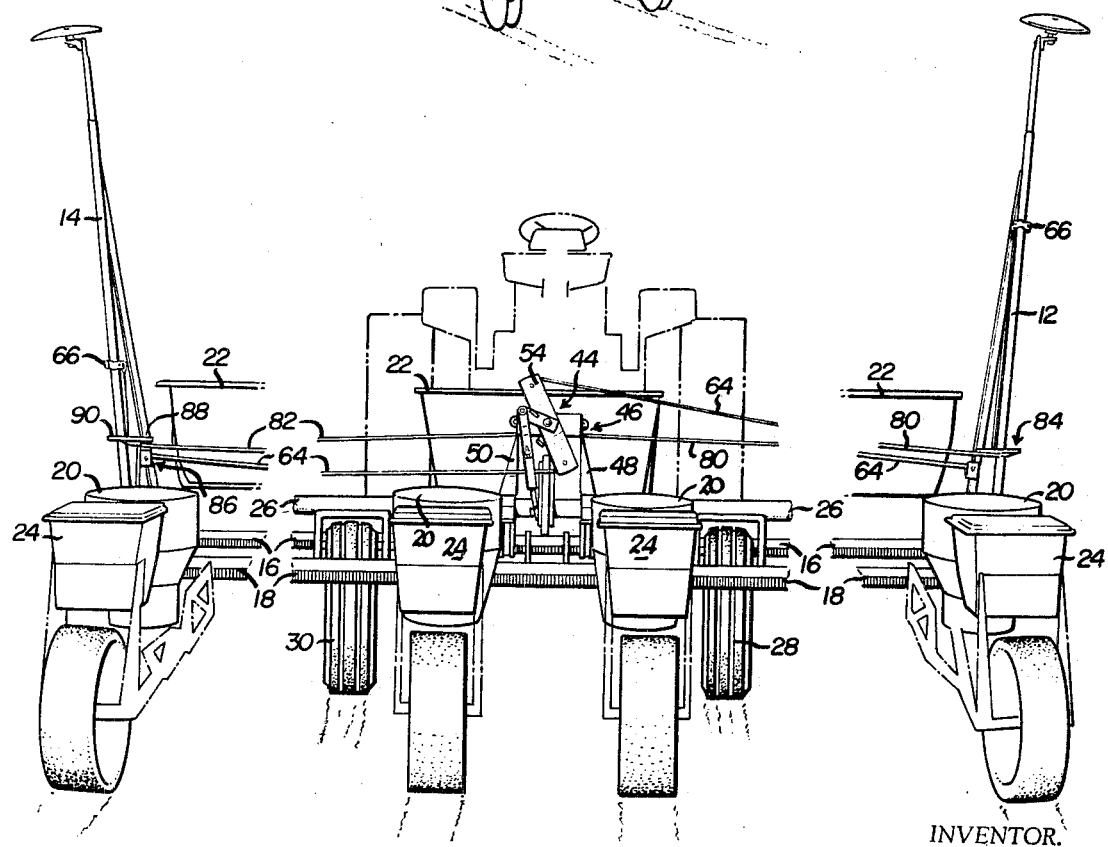
FIG. 1 is a rear view of a planter type implement incorporating the invention.

In FIG. 1 is shown a view of an implement drawn in outline form and of a type with which the present invention is particularly applicable. Only the end or side portions and the central portion are shown because of the width of the machine. The implement will be described as a seed planter carried on a trail type toolbar, however the invention could be utilized on other types of machines where it is desirable to mark the soil or ground for the next pass of the implement. The markers used with a seed planter indicate to the implement or machine operator, by means of a line or furrow in the soil, where the next or adjacent pass of the machine should be made so that the rows are kept straight and evenly spaced.

The implement carries the marker arms 12 and 14 pivotally connected to the frame at the sides thereof such that one of the arms is normally upright and the other is engagable with the ground when the implement is in the operational position. The implement has a toolbar frame structure including at least a front bar 16 and a rear bar 18, the bars being transversely disposed to the direction of travel and approximately at the same height above the ground. As stated, the implement may include additiontl toolbars for carrying other attachments, however the use of front and rear bars is for purposes of description and not limitation. The bars are joined at spaced intervals by means of linking members 19, more clearly shown in FIG. 2, suitably and securely clamped to the bars so as to provide a substantially rigid framework for carrying the seeding units 20. Fertilizer attachments 22, insecticide attachments 24, or the like, may also be carried on the toolbar frame, as shown in FIG. 1.

Figure 4:
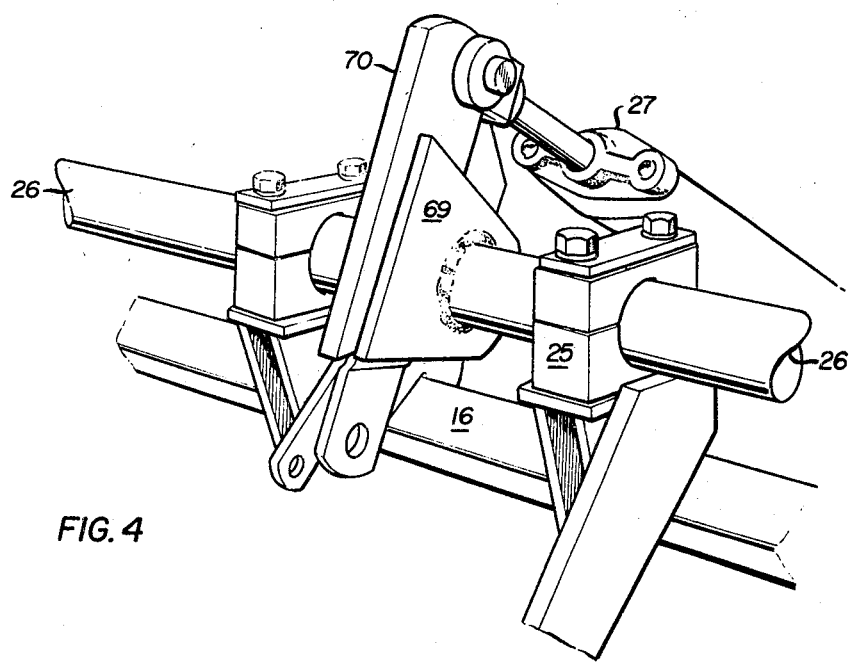
FIG. 4 is a perspective view of the implement rockshaft and the hydraulic cylinder rod attached thereto, the marker mast being omitted.

A rockshaft 26 is carried in journals or bearings 25 bracketed from the front toolbar 16 and hydraulic means 27 are connected to the frame and to the rockshaft to rotate the shaft for raising and lowering the implement. The hydraulic cylinder is connected to a frame member of the hitch and the piston rod is pivotally connected to an arm secured to the rockshaft, as better shown in FIG. 4. The hitch and its associated parts are described in a separate application relating to the transport of the machine. Ground wheels 28 and 30 are connected to the toolbar and also to the shaft such that as the hydraulic piston is extended, the shaft is rotated and the wheels are forced downwardly to raise the implement frame. Retractioin of the piston rotates the shaft to raise the wheels and to lower the implement frame for the seeding operation.

Figure 2:
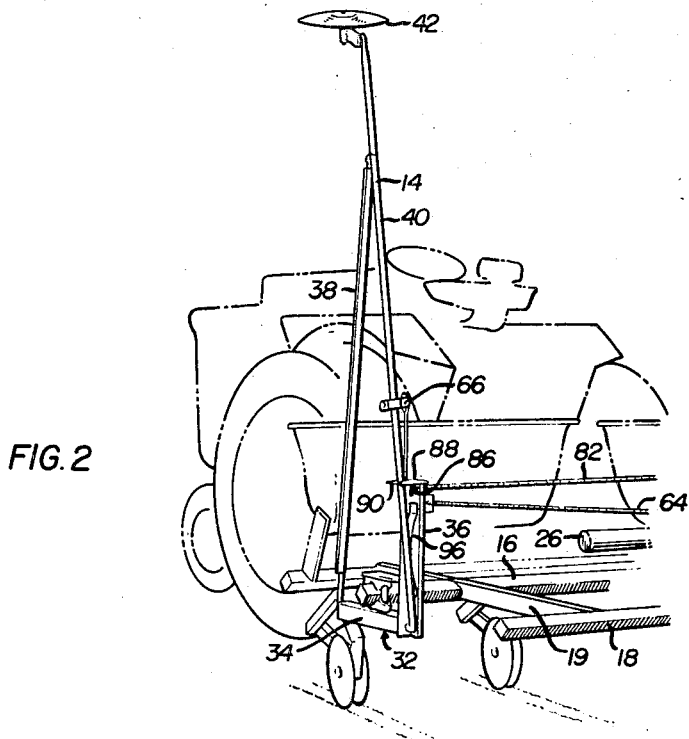
FIG. 2 is a view taken from the left rear showing one of the marker arms in a raised position and also showing the latch and spring means.

As seen in FIG. 2, the marker arm 14 is pivotally connected to a support member 32, the member being securely clamped to the end of toolbar 16. Member 32 includes a fore-and-aft extending portion 34 and a generally vertical portion 36. In the specific embodiment, the marker arm has two pipe members 38 and 40 pivoted at the lower ends thereof to the support portion 34 and which members join together to provide a support for the marker disk 42 journaled at the end of the arm. Marker arm 12 on the right side of the machine is substantially the same construction as arm 14.

Figure 3:
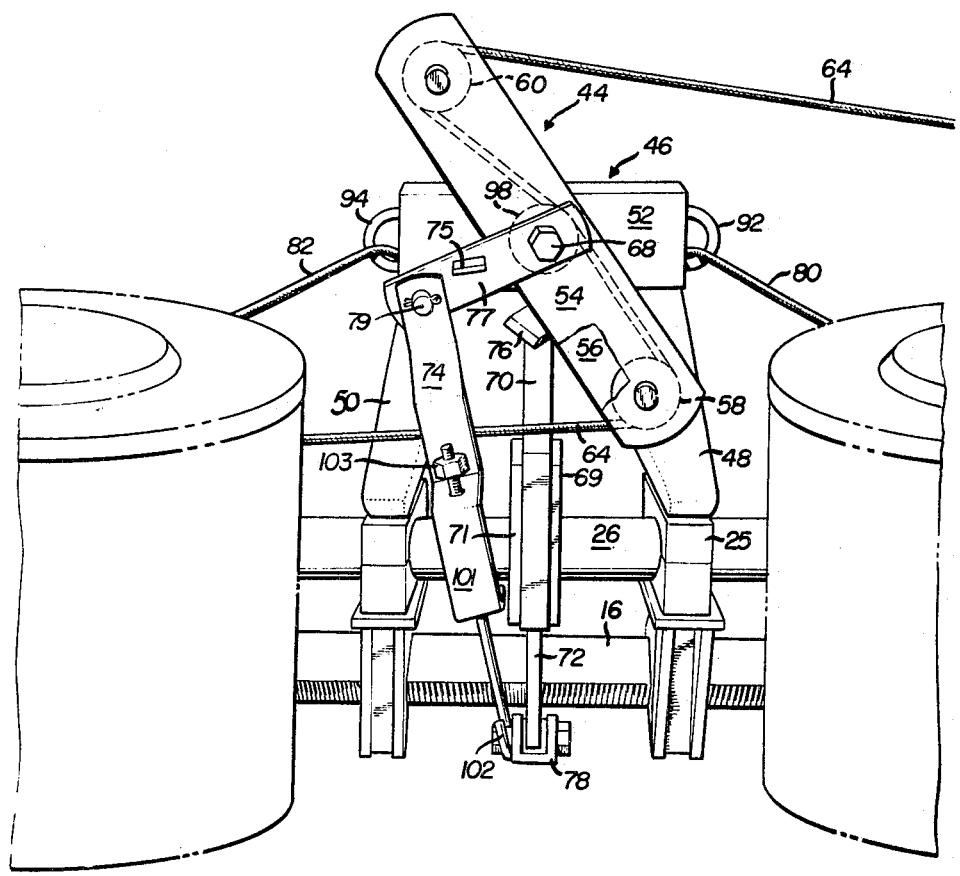
FIG. 3 is an enlarged view of the take-up reel in one embodiment.
Figure 5:
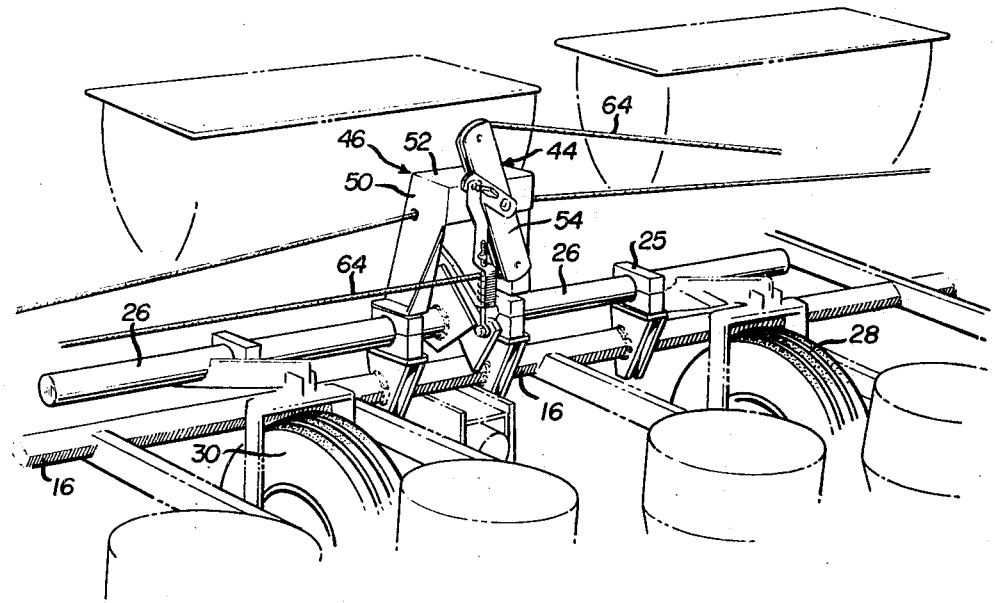
FIG. 5 is a perspective view of the marker mast and the take-up reel showing a second embodiment.
Figure 6:
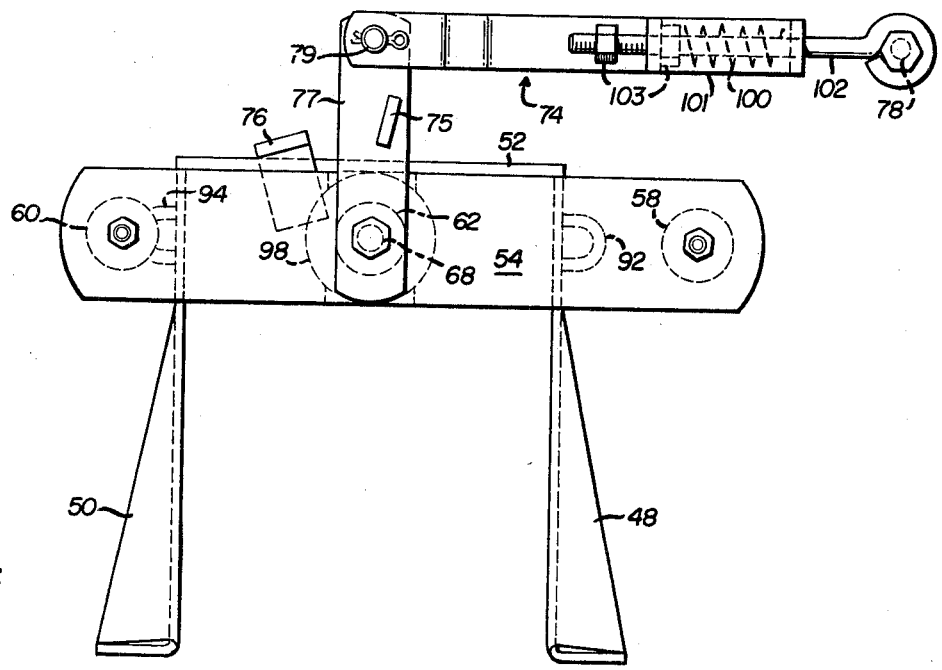
FIG. 6 is an enlarged view of the marker mast, the take-up reel and the actuating link.
Figure 7:
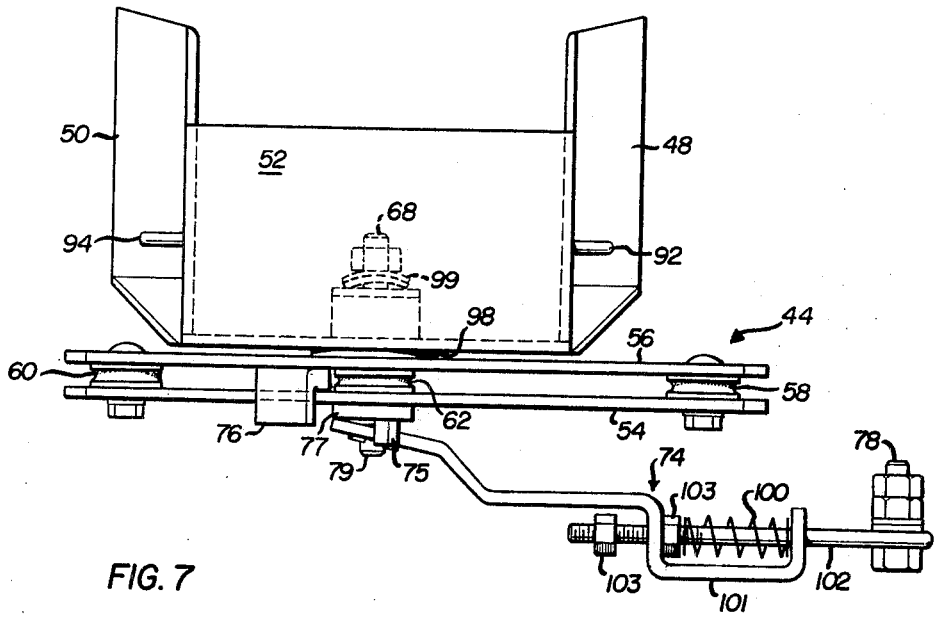
FIG. 7 is a plan view of the parts shown in FIG. 6.
Figure 8:
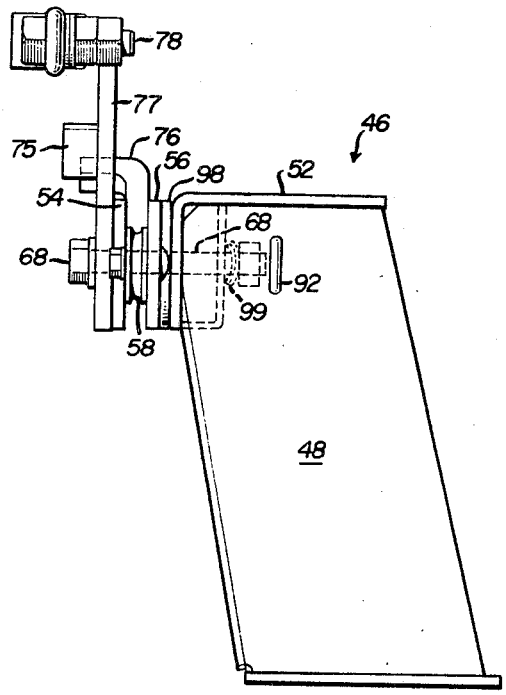
FIG. 8 is a side view of the parts shown in FIG. 6.

Mechanism for raising and lowering the markers at the desired time includes a marker take-up reel assembly, generally designated as 44, shown on the implement in FIGS. 1, 3, and 5, and detailed in FIGS. 6, 7, and 8. A marker mast designated as 46 is bolted or otherwise secured to bearing blocks 25 on rockshaft 26, there being mast side portions 48 and 50 and a connecting top portion 52. The mast provides the supporting structure for the take-up reel and the associated parts and is bridge-shaped to partially enclose the marker latching mechanism, and the arm which is connected to the piston rod. The take-up reel includes spaced longitudinal bars 54 and 56 pivotally connected for rotation by means of a bolt attached to portion 52. The reel is positioned to rotate in a substantially vertical plane and has three sheaves 58, 60, and 62 journaled therein for the cable 64 which is connected to the marker arms 12 and 14 by means of clamps 66. The cable 64 is continuous and is trained or threaded over the sheaves in the take-up reel, as best seen in FIG. 3, so that when the reel is rotated in one direction, one or the other of the markers is raised and when rotated in the other direction, one or the other is lowered. Cable 64 is sufficiently long to enable one marker to be lowered while the other remains raised, so that one side or end of the cable is stationary as the take-up reel is rotated to raise the lowered marker. The proper adjustment for the cable length is provided by the clamps 66 which can be moved up or down on the marker arms, thus the cable does not have to be detached when making adjustments in the point of attachment.

As seen in FIG. 3, bars 54 and 56 are pivotally connected to portion 52 by means of a pin or drilled bolt 68 and cable 64 is trained around sheaves 58 and 62, the sheaves being shown more clearly in FIGS. 6 and 7. Sheave 60 is journaled on pin 68 to provide direction for the cable between the bars and to prevent interference between the cable and the actuating devices. As stated, rockshaft 26 is rotated by the action of the hydraulic cylinder and the piston rod is pivotally connected to an arm 70 which is secured to the shaft by means of spaced brackets 69 and 71, the brackets being welded to the shaft. A downwardly directed arm 72 is also secured to the shaft and a marker actuating link 74 is pivotally connected to arm 72 by means of a pin 78. A reel arm 77 is pivotally connected to bolt 68 on the rearward side of the take-up reel bar 54 and is also pivotally connected to the actuating link 74 on pin 79.

A pair of pull ropes 80 and 82, best seen in FIGS. 1 and 3, are attached to marker arm latches designated as 84 and 86 on the marker arm support portion 36. Each latch includes a channel-shaped element 88 secured to portion 36 and positioned to receive a swingable latch plate 90. Plate 90 has a slot for receiving and holding leg 40 of the marker arm when the arm is in the raised position. The ropes 80 and 82 are attached to the plates to trip or release the marker arms, the ropes running from the plates to rings 92 and 94 on the sides of the marker mast, and then forward to a location on the tractor adjacent and easily accessible to the operator.

Rotation of the rockshaft raises the marker arms to substantially a vertical position when they are in the latched position rather than to an intermediate position short of the vertical. This allows the implement to be towed along narrow roads, through gates and to operate closer to fences. Since in the operation of the raising and lowering of the marker arms, the arms in the vertical position are not acted upon by the force of gravity to lower the arms when tripped by one or the other of the ropes being pulled by the operator, a flat elliptically formed leaf spring 96, FIG. 2, is securely connected to the outside surface of portion 36 to aid in controlling movement of the arm. Spring 96 is disposed vertically on portion 36 and is engageable with leg 40 of the marker arm when the arm is in the upright latched position. The spring is compressed when the arm is latched, and when the latch is tripped, the spring forces of the marker arm outwardly to a point where gravity takes effect and the arm then drops to the lowered position. Upon raising the marker arm by rotation of the rockshaft, the spring cushions the arm just prior to being latched so as to prevent possible damage to the arm and to the machine parts which damage may be caused by the momentum of the disk at the outer end of the arm. If the machine would be raised quite fast, the arm with the attached disk would also swing quite fast around its pivots on member 32, and the impact with the latch member is therefore cushioned by compressing the spring to prevent this damage.

Referring to FIGS. 6, 7, and 8, the marker reel assembly includes a pressure plate or friction disk 98 on bolt 68 and positioned between the take-up reel and the marker mast. A spring washer 99 is also positioned on the bolt 68 and retained by a slotted nut to exert some pressure on the friction disk. The friction disk and spring washer are provided to hold the take-up reel in place should the implement be lowered without tripping one of the marker arm latches. Even though the actuating link is operated or moved by rotation of the rockshaft, the take-up reel is not rotated or reversed under this condition because of the friction disk holding the reel.

The actuating link 74 is constructed to include a spring 100 for the purpose of providing an adjustment for various operating heights of the implement. The spring eliminates the necessity for adjusting the marker cable length when changing to a different operating height although the clamps 66 provide for an initial cable length adjustment. Link 74 includes an offset portion 101 formed to receive an eyebolt 102 and the spring 100, the eyebolt being pivotally connected to one end of arm 72 on pin 78, as seen in FIG. 3. Nuts 103 are provided on the threaded portion of the eyebolt and engagable with offset portion 101 to obtain the desired adjustment for the implement operation height. As the implement is raised by rotation of rockshaft 26, in a direction which forces the wheels downwardly, actuating link 74 is in effect stretched by reason of compressing spring 100 in the offset portion of the link until the nut on the eyebolt threads engages the offset portion and therefore some lost motion is available in the actuating link. The spring shortens the extended length of the actuating link as the marker approaches the vertical position and the force on the cable becomes less so as to relieve the stresses on the parts as the marker arms are being latched, yet the force is sufficient to compress the leaf spring 96 on the frame member 36. Actuating link reel arm 77 has a lug 75 fixed thereto and a lug 76 is secured to bars 54 and 56. These are provided as stop or limit means in the rotation of the take-up reel during raising and lowering of the markers. As seen in FIG. 3, the take-up reel is in the position wherein the marker arms are raised and the cable 64 is around the sheaves. FIGS. 7 and 8 show the relative positions of the lugs aligned to perform the limiting function as the marker arms are lowered to the operating position.

In the operation of the marker assembly, assume that the implement and the marker arms are in the raised position. The implement is lowered by retracting the piston and rod into the cylinder 27 whereby the wheels 28 and 30 are raised in relation to the frame. Rotation of the rockshaft, as seen from the right side of the implement, in a clockwise direction thus lowers the frame and this rotation also moves arm 72 in a clockwise direction, which in turn, moves the actuating link 74. Link 74, being pivotally connected to reel arm 77, is moved upwardly and the reel arm is allowed to rotate as the marker arm is lowered. As stated above, the cable 64 is sufficiently long to allow one marker to be lowered while the other remains raised, thus one end of the cable is stationary as the take-up reel is rotated to raise the lowered marker. When the left trip rope 82 is pulled to swing latch plate 90 and release leg 40, the leg is forced outwardly by the compressed spring 96 and the marker then is aided by gravity to the working position. At the end of the row, when the implement frame is raised by reason of extension of the piston rod, the rockshaft is rotated in a counter-clockwise direction and the wheels are forced downwardly. Rotation of the shaft thus pulls downwardly on actuating arm 74, reel arm 77 and the take-up reel is rotated to pull on cable 64, thus raising the marker. When the implement is turned at the end of the row, the right hand trip rope is pulled to release the right hand marker and the implement is lowered which lowers the marker by reason of rotation of the rockshaft. In actual operation, it is desirable to trip the selected marker just prior to or at the start of the lowering of the implement. This prevents "free-fall" of the arm which could damage the marker disk if it should strike a rock or hard ground on lowering. The operator therefore selects which of the marker arms to lower in the manual control.

Figure 10:
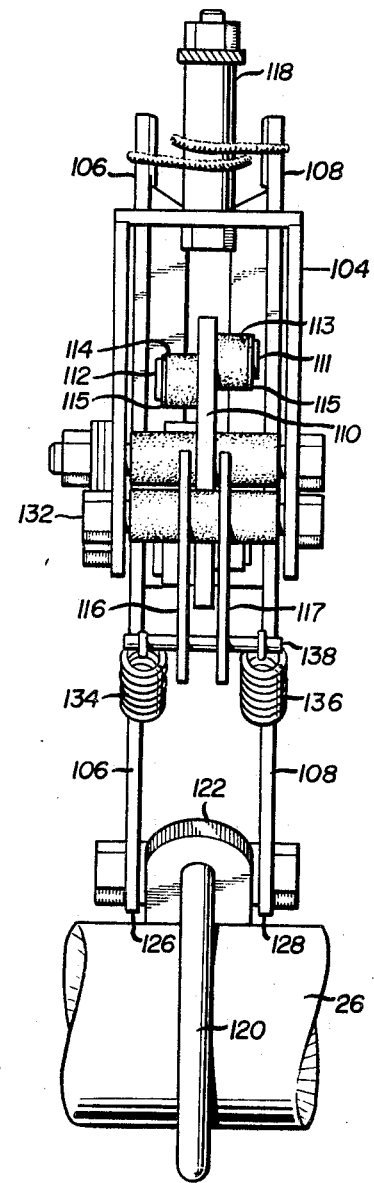
FIG. 10 is a view taken on line 10—10 of FIG. 9.
Figure 9:
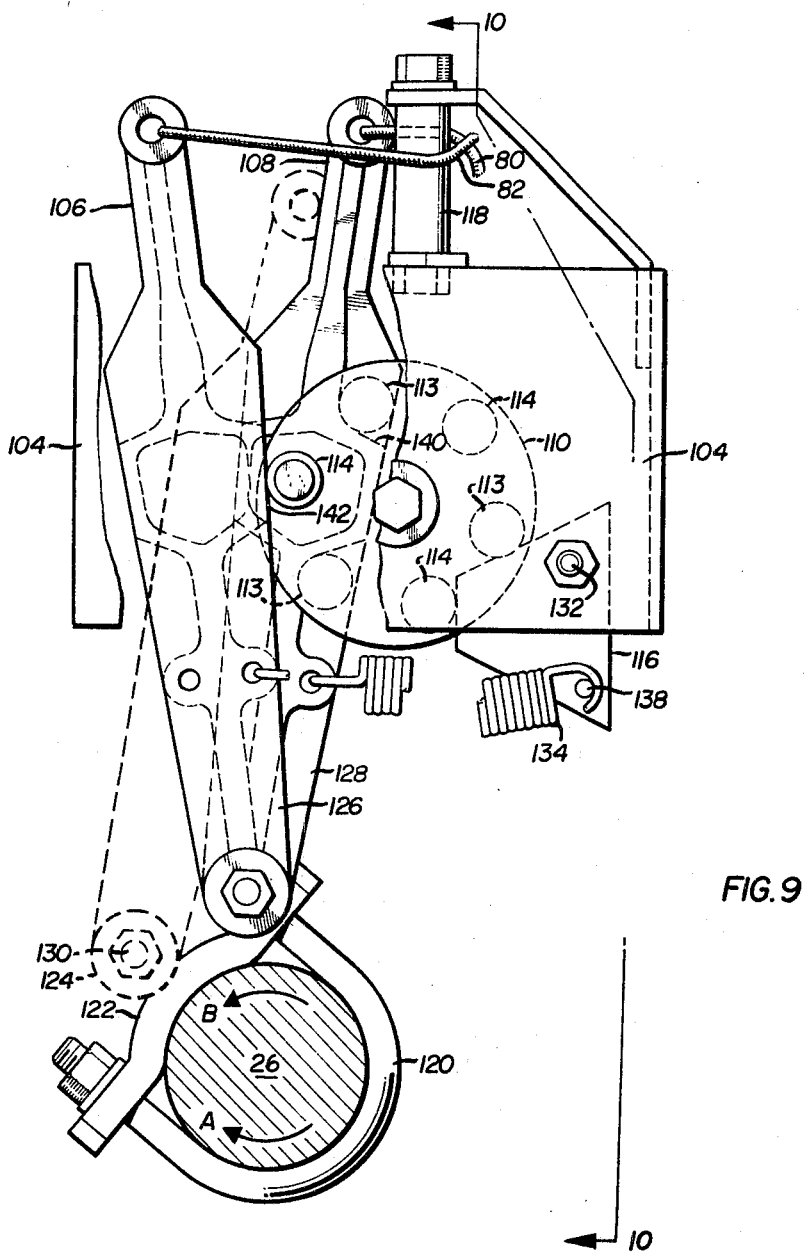
FIG. 9 is a side view of the automatic marker latch mechanism showing different positions of the actuating arms as the shaft is rotated.

FIGS. 9 and 10 show a second embodiment of the invention wherein mechanism is provided for the automatic operation of the marker arms as the implement is raised and lowered. FIGS. 1 and 5 show the automatic mechanism incorporated into the implement, as compared to FIG. 3 which shows the trip ropes extending through loops 92 and 94 and forwardly thereof for manual operation. The automatic mechanism includes a housing 104 fitted within the marker mast between side portions 48 and 50 and a double ratchet assembly having arms or pawls 106 and 108 actuated by rotation of the rockshaft. The mechanism also includes an automatic latch reel or disk 110 having spaced nibs 111 and 112 secured on the sides thereof. Three equally spaced nibs 111 are on one side of the disk and three equally spaced nibs 112 are on the other side, so that the nibs on each side are 120° apart, the nibs on one side therefore, being out of alignment from those on the other side. Rollers or bushings 113 and 114 are placed on the nibs to provide mating parts or cams for the pawls, and the bushings are retained on the nibs by snap rings 115. A latch reel stop having spaced plates 116 and 117 is positioned adjacent the disk 110 to prevent the disk from rotating back to the original position. The pawls or arms include protruding surface portions engagable with the rollers on the disk and as the implement is lowered to operating position, one of the arms rotates the disk by means of the surface portion engaging a roller to rotate the disk. A roller on the opposite side of the disk engages a surfaces portion of the opposite pawl and displaces the pawl a certain distance from the other pawl. The arm ends are thus repositioned from each other and one of the arms pulls on the rope and trips the marker latch for one of the row markers. As the implement is raised and lowered again, the action is switched or transferred from one arm to the other to automatically trip the desired marker arm. The motion is reciprocating so that the markers are alternately tripped as the implement is raised and lowered.

The automatic mechanism is provided as an optional feature to replace the operator control ropes, which in the manual trip assembly, extend forwardly to the tractor. The control ropes 80 and 82 are connected to the marker arm latch plates 90 as in the manual operation, but in the automatic assembly the inner ends of the ropes are connected to the arms 106 and 108 and are trained around a roll pin or bushing 118 on the housing 104. As the take-up reel is rotated by reason of rotation of the rockshaft, the pawls are also rotated to new positions, one of the pawls being moved in a direction from the disk 110 at the same time such that the control rope is pulled around the roll pin and the latch plate is swung to unlatch the marker arm.

Describing in detail the structure in FIGS. 9 and 10, a U-bolt 120 is around rockshaft 26 and secures a clamp 122 to the shaft. Fixed to the clamp is a bushing 124 which serves as a journal for ends 126 and 128 of the pawl arms 106 and 108, there being a pivot pin 130 through the bushing for maintaining alignment of the arm ends. FIG. 9 shows pawl arm 106 in solid lines for a portion thereof and pawl arm 108 being aligned therewith wherein the arms assume this position when the implement frame and the marker arms are both raised. In this position the piston rod is extended, the rockshaft is shown rotated in a CCW direction and the wheels are lowered for transport. FIG. 9 also shows in solid lines, with a portion of housing 104 being broken away, the position the pawl arms assume when one or the other of the marker arms are lowered.

Reel stops 116 and 117 are pivotally connected to housing 104 by means of a pin 132 and springs 134 and 136 are connected to a pin 138 projecting through the stops. The other ends of the springs are connected to the pawl arms upwardly from the rockshaft and as shown in FIG. 9, tend to maintain engagement of the pawl portions of the arms with the rollers and also keep the stops 116 and 117 engaged with the rollers. Arms 106 and 108 have enlarged cam portions facing each other which engage with the respective rollers on the reel. At the top end of the arms, apertures are placed for the trip ropes which are tied to the arms and the ropes extend around bushing 118 and out through grommets in the mast sides to the marker latch plates.

In the operation of the automatic mechanism, it is assumed that the implement is raised and both markers are in the vertical or raised position. When the machine is lowered by reason of retraction of the piston rod in the cylinder, rock-shaft 26 rotates in a clockwise direction, as viewed from the right side, and the lower ends of the pawl arms rotate with the shaft and pivot on pin 130. One of the arms, say 108, is moved upwardly and urged against one of the rollers 113 by the action of spring 136. Surface 140 of the cam portion of arm 108 contacts with roller 113 and rotates the disk 110 in a clockwise direction. Arm 106 also rotates with and moves up with arm 108, however, surface 142 of the cam portion of arm 106 contacts roller 114 on the oppoiste side of the disk and the arm is moved rearward as the disk is rotated by reason of arm 108 moving roller 113. As arm 106 is forced rearward, the trip rope is pulled around bushing 118 and thus pulls on the marker latch plate 90 to release the marker arm for operation. The distance that arm 106 is pushed rearward by roller 114 is sufficient to trip and release the marker arm.

At the end of the field, the implement is raised by extending the piston rod which rotates rockshaft 26 in a counterclockwise direction, as viewed in FIG. 9. Disk 110 with its rollers is prevented from rotating in this direction by reason of stop 116 as arms 106 and 108 assume the full line lower position as ends 126 and 128 rotate with the shaft. On raising the machine the take-up reel rotates as described above for the manual operation and the marker is raised to the vertical position.

After turning around, the implement is lowered by the hydraulic system, shaft 26 rotating clockwise, the take-up reel also rotating to let out the cable, and arm 108 is pushed rearward. Arm 106 is moved upwardly with shaft 26 and the cam surface portion pushes against roller 114 which rotates the disk 110 in a clockwise direction. Similarly as in the previous lowering operation, arm 108 contacts roller 113 and is pushed rearward thus pulling on the trip rope for releasing the opposite marker. The operation is sequential in that the disk moves in the same direction of rotation with each lowering of the implement. In the normal progress across a field during the planting operation, left and right hand turns are alternately made at each end of the field. Once the planting operation is started and the correct marker is lowered, the alternating turns at the end of the field will match the alternating action of the automatic trip mechanism and the correct marker will lower each succeeding time. If the sequence is broken, or if the correct marker is not conditioned for lowering at the start of the operation, all that is necessary is to raise and lower the implement again. Once the sequence is started, the machine then knows which of the markers is to be lowered. A spring-loaded pin is also provided on the marker arm latch for positively locking the latch in transport position so that the marker arms do not become accidentally tripped.

It is thus seen that herein shown and described is a row marker mechanism having the desirable features and advantages as set out above. One embodiment provides for a simple control of the row markers wherein the take-up reel is positioned and constructed to raise the desired marker as the implement is raised, after the marker has previously been lowered by means of an operator controlled tripping device. The second embodiment provides for automatic control of both the raising of the marker arms as the implement is raised, and the tripping of the arms as the implement is lowered.

While two embodiments of the invention have been shown and described, variations on these and other like constructions may occur to those skilled in the art. It is

What is claimed as new and desired to be secured by Letters Patent of the United States is:

1. A marker assembly for an implement having a frame, ground engaging wheels carrying the frame, a rockshaft connected to the wheels and hydraulic means connected to the frame and the rockshaft for raising and lowering the implement, said assembly including a marker arm pivotally connected to each side of the frame, an upstanding mast centrally positioned and carried on the frame, a rotatable arm pivotally connected to the mast and having sheaves journaled at the ends of the arm, a cable connected to each of said marker arms and trained over said sheaves to raise the marker arms as said arm is rotated, actuating means interconnecting the rockshaft and the rotatable arm for displacing the rotatable arm about its pivot to raise at least one of the marker arms when the hydraulic means is actuated to raise the implement.

2. An assembly in accordance with claim 1 wherein the rockshaft includes a bracket secured thereto and the hydraulic means includes a cylinder connected to the frame and a rod connected to the bracket whereby extension of the rod rotates the rockshaft and forces the rotatable arm to pull the cable for raising the marker arms.

3. An assembly in accordance with claim 1 including an upstanding frame member having latch means for holding the marker arms in the raised position.

4. An assembly in accordance with claim 1 wherein the actuating means includes a member having an offset portion and yieldable means within the offset portion for reducing the force on the cable as the marker arm is raised.

5. An assembly in accordance with claim 1 including a friction element juxtaposed the rotatable arm for resisting the rotation of said arm.

6. An assembly in accordance with claim 3 including lines connected to the latch means and extending to a position forwardly of the implement for unlatching the latch means to lower the marker arms.

7. An assembly in accordance with claim 3 including resilient means on said upstanding member engageable by the marker in the raised position and exerting an outward force on the marker arm to move the arm from the raised position as the latch means is actuated.

8. An assembly in accordance with claim 7 wherein the resilient means is a leaf spring positioned on the upstanding member for cushioning the marker arm as the arm approaches the raised position.

9. A marker assembly for an implement having a frame, a rockshaft journaled on the frame, a hydraulic cylinder connected to the frame and to the rockshaft for rotating the latter, said assembly including a marker arm pivotally connected to each side of the frame, a rotatable arm carried by said frame, a sheave on each end of said rotatable arm, connecting means operatively connected between said rockshaft and said rotatable arm for rotating the latter, a first cable connected to the marker arms and threaded onto the sheaves to raise and lower the marker arms as the rotatable arm and the rockshaft are rotated, a releasable latch means connected with each of the marker arms for releasably securing the latter pivoted upwardly, ratchet means pivotally carried by said frame, a pawl for each of the marker arms and pivotally connected to the rockshaft and movable by angular rotation of the rockshaft and being in operative connection with the said ratchet means, and two separated cables separately connected to each of the latch means and to respective ones of the pawls for freeing the marker arms from a latched position, the pawls being arranged with the ratchet means to be adapted to alternately move by reason of rotation of the rockshaft to trip one or the other of the marker arms.

10. An assembly in accordance with claim 9, wherein said ratchet means includes a disk having elements on each side thereof separately engageable by the pawls for turning the disk thereby separately moving the pawls to trip the marker arms one at a time.

11. An assembly in accordance with claim 10, wherein the elements on one side of the disk are disposed out of alignment from those on the other side for alternately moving the pawls.

12. An assembly in accordance with claim 9, including stop means pivoted on said housing and engageable with the ratchet means for preventing rotation of the ratchet means in one direction.

References Cited

UNITED STATES PATENTS

| | | | |
|---|---|---|---|
| 2,975,841 | 3/1961 | Oehler et al. | 172—128 |
| 3,428,134 | 2/1969 | Bauman et al. | 172—130 |

ROBERT E. PULFREY, Primary Examiner

S. C. PELLEGRINO, Assistant Examiner

U.S. Cl. X.R.

242—154